United States Patent [19]

Beavers et al.

[11] 4,421,999

[45] Dec. 20, 1983

[54] SUBMERSIBLE PUMP SEAL SECTION WITH MULTIPLE BELLOWS

[75] Inventors: John A. Beavers; Raymond L. Witten, both of Tulsa, Okla.

[73] Assignee: Hughes Tool Company, Houston, Tex.

[21] Appl. No.: 239,767

[22] Filed: Mar. 2, 1981

[51] Int. Cl.[3] .............................................. H02K 5/12
[52] U.S. Cl. ..................................................... 310/87
[58] Field of Search .......................................... 310/87

[56] References Cited

U.S. PATENT DOCUMENTS

| | | | |
|---|---|---|---|
| Re. 30,382 | 8/1980 | Mandell | 138/89 |
| 1,610,726 | 12/1926 | Arutunoff | 310/87 X |
| 1,842,457 | 1/1932 | Mendenhall et al. | 310/87 |
| 2,404,783 | 7/1946 | Blom | 310/87 UX |
| 3,502,919 | 3/1970 | Boyd et al. | 310/87 |
| 3,526,097 | 9/1970 | Nelson | 61/69 |
| 3,539,849 | 11/1970 | Kampfen | 310/67 |
| 3,571,636 | 3/1971 | Carle | 310/87 |
| 3,671,786 | 6/1972 | Jones | 310/87 |
| 3,688,140 | 8/1972 | Schaefer | 310/87 |
| 3,854,064 | 12/1974 | Dunbar | 310/87 |
| 3,947,709 | 3/1976 | Waltman | 310/87 |
| 4,042,847 | 8/1977 | Jensen | 310/87 |

Primary Examiner—Donovan F. Duggan
Attorney, Agent, or Firm—Robert A. Felsman; James E. Bradley

[57] ABSTRACT

A seal section for a submersible pump assembly has multiple seal chambers, each with an independent bellows. The seal section is located between the motor and the pump, and receives a shaft driven by the motor. At least one partition is located in the seal section, with the shaft sealingly passing through the partition. The partition divides the motor and seal sections into a primary chamber and at least one secondary chamber. A primary bellows is located in the primary chamber. The bellows is in contact with well fluid on one side and lubricant of the pump assembly on the other side for equalizing pressure. A secondary bellows is located in the seal section with one side in contact with the lubricant in the primary chamber and the other side in contact with the lubricant in the secondary chamber. The secondary bellows equalizes the pressures between the two chambers. A check valve in the partition allows fluid to flow from the primary chamber to the secondary chamber for replenishment, but prevents fluid flow in the opposite direction.

10 Claims, 3 Drawing Figures

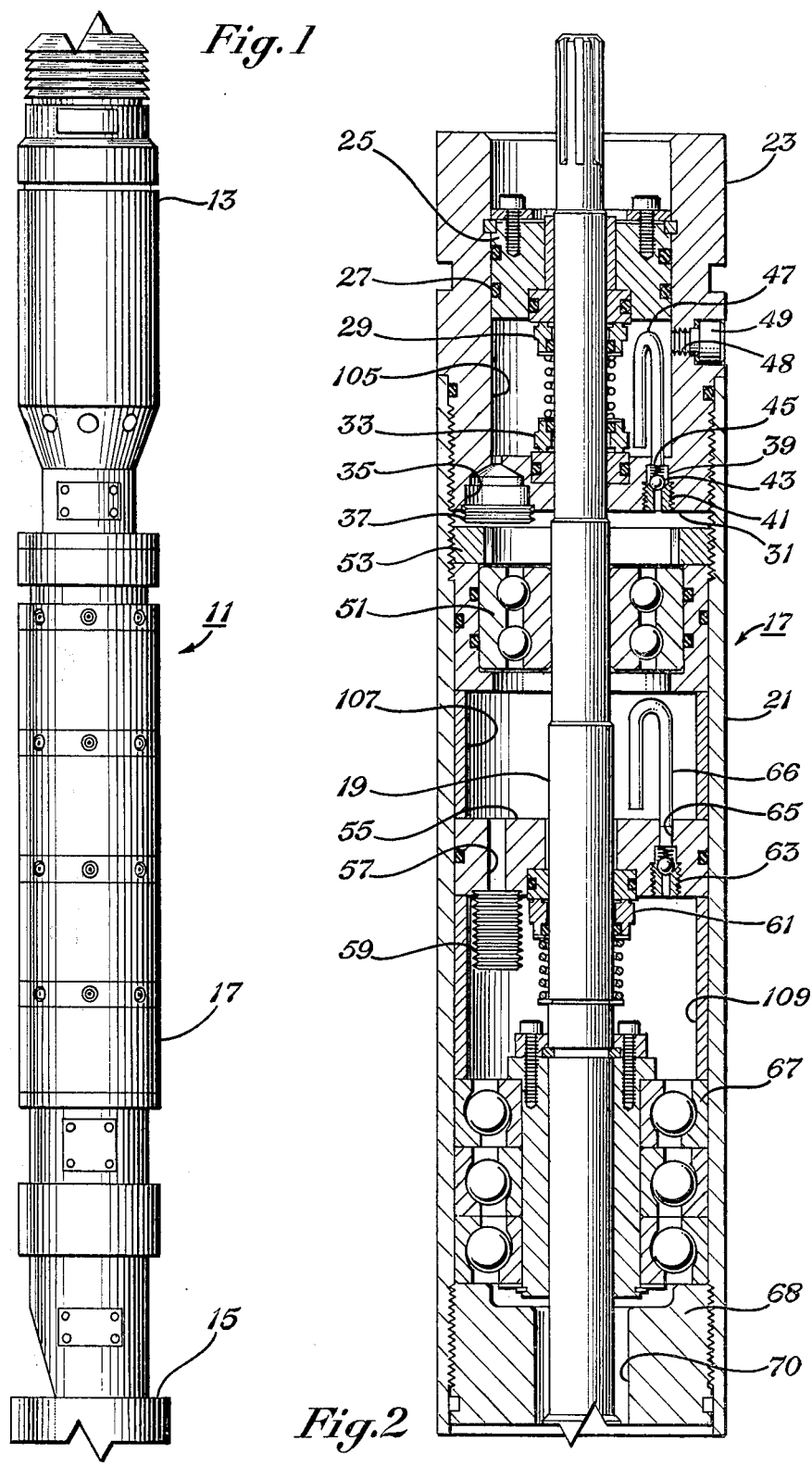

SUBMERSIBLE PUMP SEAL SECTION WITH MULTIPLE BELLOWS

BACKGROUND OF THE INVENTION

Electrical submersible pumps for high volume wells such as oil wells normally have three major sections, a motor section and a pump section separated by a seal section. A shaft on the end of a rotor assembly of the motor extends through the seal section for rotating the centrifugal pump. The motor and the seal sections contain oil for lubricating and cooling.

The seal section has features to equalize the lubricating oil pressure with the well fluid pressure, and to accommodate thermal expansion of the lubrication oil. The pressure compensation is handled in various manners, all of which require the entry of well fluid into some component of the pump assembly. Often, the well fluid includes water with a high salt content, and thus a low resistance. The electrical motor may be damaged if the well fluid contacts the motor. Consequently, the prior art pressure compensation systems use various means to avoid entry of well fluid into the motor section.

Some types use a bellows or elastomeric barrier, such as shown in U.S. Pat. No. 3,947,709. Well fluid on the outside of the bellows acts against lubrication located on the inside of the bellows to equalize pressure and allow for temperature compensation.

Another prior art feature is the use of multiple seal chambers consisting of several partitions located within the seal section. Each partition has an aperture for the shaft to pass through and means for sealing the shaft so that fluid cannot leak around the shaft from one chamber to the other. It is necessary that the pressures in these seal chambers equal each other and approximately equal the well fluid pressure. To accomplish this in the prior art, U-tubes interconnect the chambers. The U-tubes are arranged so that they will allow lubricating oil to pass between chambers in both directions, but discourage the heavier well fluids from migrating between the chambers. In this prior art system a liquid interface always exists between the chambers.

SUMMARY OF THE INVENTION

The device of this invention utilizes a large, primary bellows or elastomeric barrier for pressure compensation. The device also has several seal chambers located in the seal section. The seal chambers are sealed from each other so that fluid will not be allowed to pass downward from one seal chamber to the next. To equalize the pressure between the seal chambers, a small bellows is located in each seal chamber. The bellows has one side in communication with one seal chamber, with the other side in communication with the next seal chamber. A check valve allows fluid to pass from a lower seal chamber to the next upward seal chamber when the pressure differential reaches a selected minimum, but prevents fluid flow in the opposite direction. The check valve allows the seal chambers to be filled with lubricating oil when the motor section i filled and also allows the seal chambers to be replenished from the primary bellows in the event of a leak in the upper mechanical seal.

BRIEF DESCRIPTION OF THE DRAWINGS

FIG. 1 is a partial front view of a pump assembly constructed in accordance with this invention.

FIG. 2 is a partial vertical sectional view of the seal section of a pump assembly constructed in accordance with this invention.

DESCRIPTION OF THE PREFERRED EMBODIMENT

Figure 3:
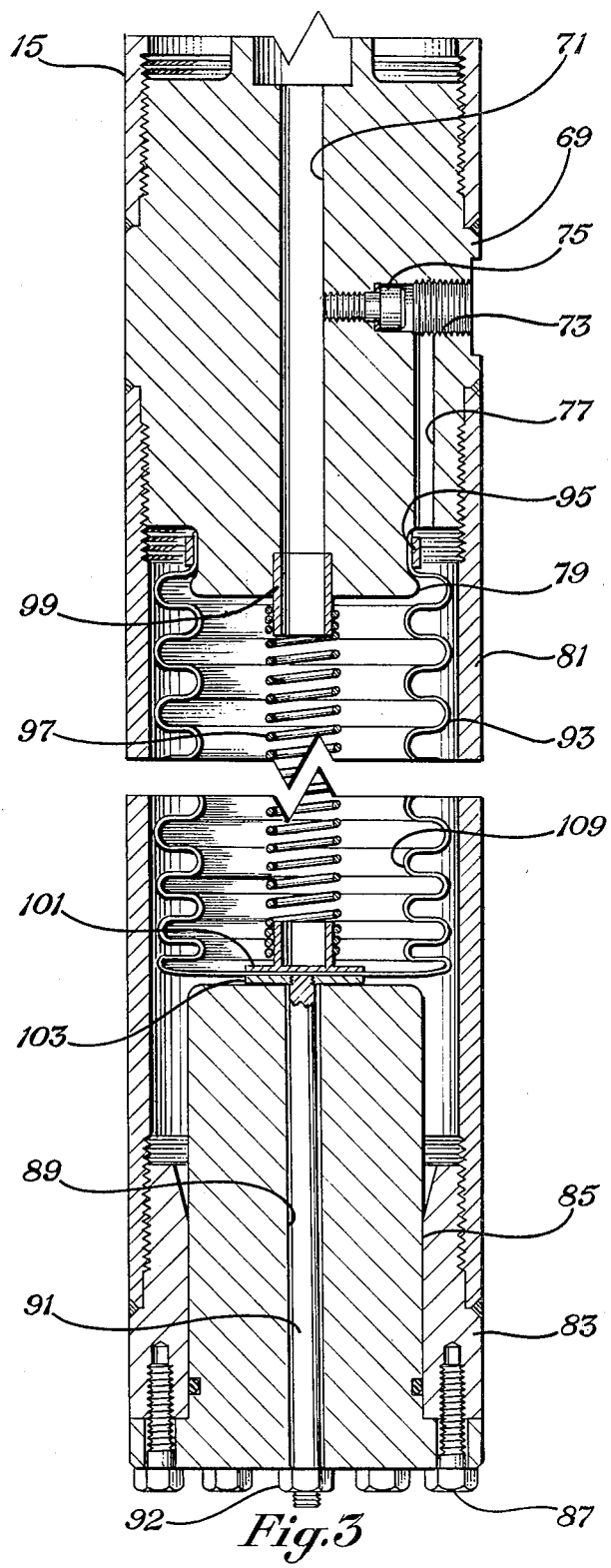
FIG. 3 is a partial vertical sectional view of the lower end of the motor section of the pump assembly of FIG. 2, shown in the transporting position.

Referring to FIG. 1, portions of a pump assembly 11 include a centrifugal pump 13 and an electrical motor 15 separated by a seal section 17.

Referring to FIG. 2, the rotor (not shown) of the electrical motor 15 has a shaft 19 that extends upwardly through the seal section 17. The top of shaft 19 engages the bottom of pump 13 for rotating the pump. The seal section 17 includes a tubular housing 21 through which shaft 19 axially extends. Tubular housing 21 includes an upper sub 23 that is connected to pump 13. An upper end plate 25 is located in upper sub 23. Plate 25 is mounted in the cylindrical passage of upper sub 23 and sealed by O-rings 27. Shaft 19 extends through a central passage in plate 25. A conventional seal assembly 29 rotatably seals the shaft 19, to prevent fluid from leaking around shaft 19 past the plate.

A first partition 31 is located at the base of upper sub 23. A seal assembly 33 similar to seal assembly 29 rotatably seals shaft 19. A port 35 adjacent shaft 19 extends through partition 31. A first bellows 37 is secured to the lower side of partition 31 around port 35. Bellows 37 is a cylindrical, cup-shaped elastomeric bellows or diaphragm that will expand and contract in response to pressure differential above and below partition 31. The term "bellows" is used herein to refer to any barrier or membrane that moves in response to fluid pressure differential to equalize the pressures.

Bellows 37 is sized to increase in volume equal to the maximum thermal expansion expected of the oil in the chamber above partition 31. The maximum thermal expansion of the oil depends on the chamber size plus the expected temperature increase from the temperature at filling and the temperature when operating. The operating temperature depends on well temperature and temperature increase due to friction of the rotating components. In the preferred embodiment, the maximum expected temperature increase is 300° F.

A passage 39 extends through partition 31 adjacent shaft 19. Passage 39 contains a check valve 41 that serves as a check valve means to allow fluid to pass in an upward direction at a selected minimum pressure differential, but prevent fluid from passing through passage 39 in a downward direction. Check valve 41 is of a conventional type having a ball 43 urged downward by a spring 45. The ball seats on a reduced diameter portion of passage 39 to prevent fluid flow in a downward direction. When unseated, fluid flows upward around ball 43. The minimum pressure differential to unseat ball 43 is preferably about 5 psi (pounds per square inch). A U-shaped tube 47 is mounted in the top of passage 39. Tube 47 has a bend or bight above partition 31. The discharge end of tube 47 is located below the bight near the upper surface of partition 31. Upper sub 23 also includes a vacuum port 48 that is closed by a threaded plug 49.

A set of bearings 51 is mounted below partition 31 and secured by a cylindrical lock ring 53. Bearings 51 rotatably support shaft 19 in the center of the seal section housing 21. A second partition 55 is spaced downwardly from partition 31 and sealed in housing 21 with O-rings. Partition 55 also has a port 57 to which is secured a bellows 59. Bellows 59 is also an elastomeric, cylindrical, cup-shaped device for equalizing pressure across partition 55. Bellows 59 is sized to handle the maximum thermal expansion of volume expected in the chamber above the partition 31 and the chamber between partitions 31 and 55. The capacity of bellows 37 can be smaller since it must handle only the expansion volume of the chamber above partition 31. A seal assembly 61 seals shaft 19. A check valve 63 is located in a passage 65 for preventing fluid flow in the downward direction, but allowing fluid flow in the upward direction if the selected minimum pressure differential is reached. Check valve 63 is identical to check valve 41. A U-tube 66 identical to U-tube 47 extends upwardly from passage 65 and has an entrance located just above the top of partition 55.

A thrust bearing assembly 67 is mounted at the lower end of seal section 17. Thrust bearing 67 absorbs downward or upward thrust exerted by pump 13, and rotatably supports shaft 19. The upper end of motor 15 includes a cylindrical neck 68 with a central passage 70 for shaft 19. Neck 68 is secured inside the bottom of seal section housing 21, serving also to retain bearings 67. Passage 70 is larger than shaft 19 to allow the free passage of lubricating oil. The electrical motor (not shown in detail) is located below the neck 68.

Referring to FIG. 3, a lower sub 69 is secured by threads to the bottom of the housing of motor 15. Lower sub 69 has an axial passage 71 extending through it that is in communication with passage 70. A transverse threaded passage 73 extends from the exterior of lower sub 69 to the axial passage 71. Threaded passage 73 has an enlarged diameter portion at the entrance and a reduced diameter portion that intersects axial passage 71.

The reduced diameter portion receives a threaded plug 75 to selectively close intersection of passage 71 with passage 73. A vertical passage 77 extends from the enlarged portion of threaded passage 73 to the lower end of lower sub 69. Lower sub 69 has a neck or reduced diameter portion 79 on its lower end. The lower end of vertical passage 77 intersects an annular shoulder encircling neck 79. The head of thread plug 75, when plug 75 is fully tightened as shown, is located inward from vertical passage 77 so as to not interfere with fluid movement between the enlarged diameter portion of transverse passage 73 and vertical passage 77.

A tubular lower housing 81 has threads on its upper end that are secured to threads formed on the lower end of lower sub 69. Lower housing 81 has threads on its lower end for receiving a plug adapter 83. Plug adapter 83 is an annular sleeve that has an inner bore for sealingly receiving a plug 85. Bolts 87 releasably secure plug 85 to the plug adapter 83. Plug 85, which is used only for filling and transporting of the tool, not downhole usage, has an axial passage 89 extending through it. Axial passage 89 is adapted to receive a threaded rod 91 that has threads on both ends. A nut 92 engages the lower end of rod 91 to move rod 91 longitudinally.

A large, primary bellows 93 is secured to neck 79 by a retaining ring 95. Bellows 93 is preferably an elastomeric, cup-shaped, generally cylindrical bellows of a diameter slightly less than the inner diameter of lower housing 81. The size of bellows 93 is considerably greater than the size of bellows 37 and 59, since it must handle the maximum expected thermal expansion of oil in the chamber below partition 55, the chamber between partitions 55 and 31, and above partition 31. A helical or coil spring 97 is located inside bellows 93. Coil spring 97 is shown in tension. It exerts an upward force, urging the lower end of bellows 93 upward toward neck 79 until the spring reaches its natural condition. The upper end of coil spring 97 is secured to a tube 99 that is inserted in the lowr end of passage 71. The lower end of coil spring 97 is secured to a tubular bracket 101 with a circular flange secured to the bottom of bellows 93. A circular plate 103 is located on the lower side of the bottom of bellows 93 and may be secured to the flange of bracket 101 by suitable fasteners. Plate 103 has a threaded aperture for receiving the upper threaded end of rod 91.

Referring to FIG. 2, the first partition 25 and the second partition 31 define a first chamber 105 between them. The second partition 31 and the third partition 55 define between them a second chamber 107. A third chamber 109 extends from the lower side of the third partition 55 down through the motor 15, passage 71, and terminates in the interior of bellows 93. The third or lower chamber 109 should be considered the primary chamber since it is first affected by well fluid pressure. The upper chambers 107 and 105 should be considered secondary chambers since they respond to pressure changes with respect to the primary chamber, not directly to well fluid pressure changes. Bellows 59 and 37 should be considered secondary bellows.

To fill the pump assembly 11 for operation, vacuum plug 49 (FIG. 2) is removed, and a vacuum pump (not shown) is connected into the threaded port. Threaded rod 91 (FIG. 3) is inserted through passage 89 in plug 85, and screwed into the bottom of plate 103 on the bottom of bellows 93. Nut 92 is tightened on the lower threads of rod 91 until plate 103 is brought into sealing contact with the upper end of plug 85. This restrains any axial movement of bellows 93 and places spring 97 in tension. Oil fill plug 75 is removed from threaded port 73. The hose nozzle of a reservoir of oil (not shown) is screwed into the enlarged threads of threaded passage 73 no farther inward than vertical passage 77. Vertical passage 77 remains in communication with axial passage 71 by way of the reduced diameter portion of passage 73. The hose nozzle has a valve, and the valve is closed initially.

Then the vacuum pump is turned on, with the valve closed to the oil reservoir, to evacuate the air from all of the chambers. Vacuum will be drawn from both the inside and outside of each of the bellows, including bellows 93, preventing them from collapsing due to a pressure differential. The lower pressure at the vacuum port 48 than elsewhere causes both check valves 41 and 63 to open to equalize the pressure across the partition 31 and 55.

After a sufficient vacuum is reached, the valve to the oil reservoir is opened while the vacuum pump continues to run. Oil will be drawn into passage 71 and into the interior of bellows 93. Oil will also fill housing 81 on the exterior of bellows 93. The oil will be drawn upward through passage 70, through spaces between bearings 67 and into the upper portion of the third chamber 109. The oil will be drawn through passage 65 since check valve 63 will be open, and commence filling second chamber 107.

The oil will pass through spaces in bearings 51 and pass through passage 39 through check valve 41. Oil will then fill the first chamber 105. When completely full, and when oil starts to enter the vacuum pump, the vacuum pump is turned off. The reservoir of oil is disconnected from passage 73 and threaded plug 75 is tightened into the reduced portion of threaded passage 73. Ambient pressure will exist on the outside of bellows 93 within housing 81, and also in the lubricant chambers 105, 107, and 109. Oil in lower housing 81 on the exterior of bellows 93 may be drained through passage 73, if desired. The tool is transported to the well site in this condition.

At the well site, nut 92 is removed from threaded rod 91, and the threaded rod 91 is unscrewed from plate 103, freeing the bellows 93 for axial movement. Spring 97 will be unable to contract the bellows 93, however, because the chambers 105, 107 and 109 will be completely full and sealed by vacuum plug 49 (FIG. 2). Then plug 85 is removed from the plug adapter 83 by removing bolts 87. A smaller operational plug (not shown) is inserted into plug adapter 83. The operational plug is the same diameter as plug 85, but only about one third its height. This allows a much larger distance for bellows 93 to axially move.

The pump 13 is attached to the upper end of the seal section 17, and the pump assembly is lowered into the well, normally on sections of tubing. As the tool proceeds downward, the ambient pressure surrounding the tool increases due to the hydrostatic weight of liquid in the well. Well fluid will enter passages 73 and 77, exerting a force on the exterior of bellows 93. As bellows 93 contracts, it increases the pressure within the third chamber 109 until the pressure in third chamber 109 equals the hydrostatic pressure. The higher pressure in third chamber 109 than in the second chamber 107 will cause the second bellows 59 to contract, increasing the pressure in second chamber 107. The increased pressure in second chamber 107 will cause the first bellows 37 to contract, increasing the pressure in first chamber 105. When equilibrium is reached, the pressures in chambers 105, 107, and 109 should equal each other and should equal the hydrostatic pressure. Restraining bellows 93 from contraction during the oil filling process assures that bellows 93 has the ability to contract sufficiently to equalize the internal pressure with external during running-in.

The temperature within wells normally increases with depth. During operation, frictional heat also increases the lubricating oil temperature. At greater temperatures, the oil within the tool will expand, resulting in, if not compensated, a greater pressure within the tool than the hydrostatic pressure. Expansion of oil in first chamber 105 causes bellows 37 to expand. Bellows 37 will increase in volume to handle the expansion of oil volume in the first chamber 105, reducing pressure increase in first chamber 105 due to temperature increase. Expansion of bellows 37 momentarily increases the pressure within second chamber 107 since it will reduce the volume in chamber 107. Increased pressure within second chamber 107 due to bellows 37 expansion and due to thermal expansion of oil in second chamber 107 causes the second bellows 59 to expand. Bellows 59 will expand in volume equal to the thermal volume expansion of the oil in second chamber 107 plus the thermal volume expansion of the oil in first chamber 105, since bellows 37 expansion reduces the volume of chamber 107. Bellows 59 expansion momentarily increases the pressure within third chamber 109 since it reduces the volume in the third chamber. Increased pressure within third chamber 109 due to bellows 59 expansion and due to thermal expansion of oil in third chamber 109 causes bellows 93 to expand. Bellows 93 will expand in volume equal to the thermal volume expansion of the oil in third chamber 109 plus the thermal volume exansion of the oil in first and second chambers 105 and 107. Bellows 93 expansion increases the volume of the third chamber 109 until the pressures in the three chambers equal each other and equal the hydrostatic or ambient exterior pressure.

If, during operation, oil should be depleted from the first or second chambers, replenishment can be provided from the next lower chamber. For example, if the first chamber leaks oil out past its various seals to the exterior, the first bellows 37 will contract, tending to equalize the pressure between the first chamber 105 and the second chamber 107. If the first bellows 37 contracts or collapses to the maximum extent possible, then it will be unable to apply additional pressure to first chamber 105. Once the pressure in chamber 107 exceeds the pressure in chamber 105 by a selected amount, preferably about 5 psi, check valve 41 will open, allowing fluid from the second chamber to flow up through tube 47 into the first chamber 105. The second chamber 107 will be replenished by fluid flowing up through check valve 63. Bellows 93 will contract to supply fluid from the third chamber 109. The check valves 41 and 63 open only when their respective bellows 37 and 59 have fully collapsed.

Should well fluid enter any of the chambers, it will tend to migrate downward since the lubricating oil is normally ligher in weight. Fluid cannot normally proceed downward from one chamber to another, however, since the partitions are sealed against any downward movement of fluid. U-tubes 47 and 65 serve to prevent well fluid from inadvertently flowing downward past the check valves 41 and 63 when the check valves are open to allow upward flow, The heavier well fluid will not likely flow upward in the U-tubes 47 and 65, around the bights, then downward past the check valves when the check valves are open.

The invention has significant advantages. The three separate chambers serve to prevent migration of well fluid into the motor. Secondary bellows for the separate chambers equalize pressure without having the need for a fluid interface between chambers. Temperature and hydrostatic pressure changes are handled through the primary and secondary bellows.

While the invention has been shown in only one of its forms, it should be apparent to those skilled in the art that it is not so limited but is susceptible to various changes without departing from the spirit of the invention.

We claim:

1. In a submersible pump assembly of the type having a motor section with a shaft extending through a seal section to a pump, an improved means for reducing pressure differential between lubricant fluid in the motor and seal sections and well fluid, comprising in combination:

a partition in the seal section, dividing the motor and seal sections into a primary chamber and a secondary chamber, with the shaft sealingly passing through the partition;

a primary pressure compensator means separating well fluid from lubricant fluid in the primary chamber, for reducing pressure differential between the lubricant in the primary chamber and well fluid;

a secondary pressure compensator means mounted to a port in the partition, separating lubricant fluid contained in the secondary chamber from lubricant fluid contained in the primary chamber, for reducing pressure differential between lubricant in the secondary chamber and lubricant in the primary chamber.

2. In a submersible pump assembly of the type having a motor section with a shaft extending through a seal section to a pump, an improved means for reducing pressure differential between lubricant fluid in the motor and seal sections and well fluid, comprising in combination:

a partition in the seal section, dividing the motor and seal sections into a primary chamber and a secondary chamber with the shaft sealingly passing through the partition;

a primary pressure compensator means separating well fluid from lubricant fluid in the primary chamber, for reducing pressure differential between the lubricant in the primary chamber and well fluid;

a secondary pressure compensator means mounted to a port in the partition, separating lubricant fluid contained in the secondary chamber from lubricant fluid contained in the primary chamber, for reducing pressure differential between lubricant in the secondary chamber and lubricant in the primary chamber; and check valve means located in a passage in the partition, for allowing lubricant fluid to pass from the primary chamber to the secondary chamber, when the pressure in the primary chamber exceeds the pressure in the secondary chamber by a selected amount, but preventing lubricant fluid flow in the opposite direction.

3. In a submersible pump assembly of the type having a motor section with a shaft extending through a seal section to a pump, an improved means for reducing pressure differential between lubricant fluid in the motor and seal sections and well fluid, comprising in combination:

a partition in the seal section, dividing the motor and seal sections into a primary chamber and a secondary chamber with the shaft sealingly passing through the partition;

a primary pressure compensator means for the primary chamber, having one side in communication with well fluid the other side being in communication with lubricant fluid in the primary chamber, and being movable for reducing pressure differential between the lubricant in the primary chamber and well fluid;

a secondary pressure compensator means mounted to a port in the partition, having one side in communication with lubricant fluid contained in the secondary chamber, the other side being in communication with lubricant fluid contained in the primary chamber, and being movable for reducing pressure differential between the lubricant in the secondary chamber and lubricant in the primary chamber;

the primary pressure compensator means being sized to increase the volume of the primary chamber an amount equal to the maximum thermal expansion expected of the lubricant fluid in the primary and secondary chambers;

the secondary pressure compensator means being smaller in capacity than the primary pressure compensator means and sized to increase the volume of the secondary chamber an amount equal to the maximum thermal expansion of the lubricant fluid in the secondary chamber; and check valve means located in a passage in the partition, for allowing lubricant fluid to pass from the primary chamber to the secondary chamber, when the pressure in the primary chamber exceeds the pressure in the secondary chamber by a selected amount, but preventing lubricant fluid flow in the opposite direction.

4. In a submersible pump assembly of the type having a motor section with a shaft extending upwardly through a seal section to a pump, an improved means for reducing pressure differential between lubricant fluid in the motor and seal sections and well fluid, comprising in combination:

partition means in the seal section for dividing the motor and seal sections into a lower chamber and an upper chamber and for preventing fluid flow from the upper chamber to the lower chamber, the shaft sealingly passing through partition means, the upper chamber being sealed from well fluid;

an upper pressure compensator mounted to the partition means, having one side in communication with lubricant fluid contained in the lower chamber and the other side in communication with lubricant fluid contained in the upper chamber, through a port in the partition means, and being movable in response to pressure differential between the chambers; and a lower pressure compensator having one side in communication with well fluid, the other side being in communication with lubricant fluid in the lower chamber, the lower pressure compensator being movable in response to pressure differential between lubricant in the lower chamber and well fluid.

5. In a submersible pump assembly of the type having a motor section with a shaft extending upwardly through a seal section to a pump, an improved means for reducing the pressure differential between lubricant fluid in the motor and seal sections and well fluid, comprising in combination:

a partition in the seal section, dividing the motor and seal sections into a lower chamber and an uppper chamber, with the shaft passing sealingly through the partition, the upper chamber being sealed from well fluid;

an upper bellows mounted to the partition having one side in communication with lubricant fluid in the lower chamber and the other side in communication with lubricant fluid in the upper chamber, through a port in the partition;

a lower bellows located below the shaft, having one side in communication with well fluid, the other side being in communication with lubricant fluid in the lower chamber; and check valve means in a passage located in the partition, for allowing fluid to pass from the lower chamber to the upper chamber when the pressure in the lower chamber exceeds the pressure in the upper chamber by a selected amount, but preventing fluid flow in the opposite direction.

6. In a submersible pump assembly of the type having a motor section with a shaft extending upwardly through a seal section to a pump, an improved means for reducing the pressure differential between lubricant fluid in the motor seal sections and well fluid, comprising in combination:
- a partition in the seal section, dividing the motor and seal sections into a lower chamber and an upper chamber, with the shaft passing sealingly through the partition, the upper chamber being sealed from well fluid;
- an upper bellows mounted to the partition having one side in communication with lubricant fluid in the lower chamber and the other side in communication with lubricant fluid in the upper chamber, through a port in the partition;
- a lower bellows located in the motor section below the shaft, having one side in communication with well fluid through a port in the motor section, the other side being in communication with lubricant fluid in the lower chamber;
- the lower bellows being larger in capacity than the upper bellows and sized to expand an amount equal to the maximum thermal expansion expected of the lubricant fluid in the upper and lower chambers;
- the upper bellows being sized to expand an amount equal to the maximum thermal expansion expected of the lubricant fluid in the upper chamber; and
- check valve means in a passage located in the partition, for allowing fluid to pass from the lower chamber to the upper chamber when the pressure in the lower chamber exceeds the pressure in the upper chamber by a selected amount, but preventing fluid flow in the opposite direction.

7. In a submersible pump assembly of the type having a motor located in a motor section that has a shaft extending upwardly through a seal section to a pump, an improved means for reducing pressure differential between lubricant fluid in the motor and seal sections and well fluid, comprising in combination:
- a partition in the seal section, dividing the motor and seal sections into a lower chamber that includes the motor, and an upper chamber above the partition, with the the shaft passing sealingly through the partition, the upper chamber being sealed from well fluid;
- a substantially cup-shaped upper bellows sealingly mounted to the lower side of the partition at a location offset from the shaft, the upper bellows having a mouth and an interior in communication with the lubricant fluid in the upper chamber by way of a port extending through the partition, the upper bellows having an outer surface in contact with lubricant fluid in the lower chamber;
- a substantially cup-shaped lower bellows larger in capacity than the upper bellows and located below the motor in the motor section, the lower bellows having a mouth and interior that defines the lower end of the lower chamber, the lower bellows having an outer surface that is in contact with well fluid received through a port in the motor section;
- check valve means mounted in a passage formed in the partition for allowing fluid to pass from the lower chamber to the upper chamber when the pressure in the lower chamber exceeds the pressure in the upper chamber by a selected amount and when the upper bellows has fully collapsed, but preventing fluid flow in the opposite direction; and
- a substantially U-shaped tube extending upwardly from the upper side of the passage in the partition, the tube having a bight on its upper end and having a discharge end spaced below the bight.

8. In a submersible pump assembly of the type having a motor section with a shaft extending through a seal section to a pump, an improved means for reducing pressure differential between lubricant fluid in the motor and seal sections and well fluid, comprising in combination:
- a first partition in the seal section, defining a first chamber on one side of the first partition;
- a second partition spaced from the first partition in the seal section, defining a second chamber between the first and second partitions, and defining a third chamber on the other side of the second partition;
- the shaft sealingly passing through both of the partitions;
- a first bellows secured to the first partition, having one side in communication with lubricant fluid in the first chamber and another side in communication with lubricant fluid in the second chamber through a port extending through the first partition adjacent the shaft, the first bellows having the ability to expand sufficiently to accomodate thermal expansion in the first chamber of the lubricant fluid;
- a second bellows secured to the second partition, having one side in communication with lubricant fluid in the second chamber and another side in communication with lubricant fluid in the third chamber, through a port extending through the second partition adjacent the shaft; the second bellows having the ability to expand sufficiently to accommodate thermal expansion of the lubricant fluid in the first and second chambers;
- a third bellows in the third chamber, having one side in communication with well fluid through a port in the motor section and another side in communication with lubricant fluid in the third chamber, the third bellows having the ability to expand sufficiently to accommodate thermal expansion of the lubricant fluid in the first, second, and third chambers;
- a first check valve means located in a passage in the first partition, for allowing fluid to pass from the second chamber to the first chamber when the pressure differential exceeds a selected minimum, and for preventing fluid flow in the opposite direction; and
- a second check valve means located in a passage in the second partition for allowing fluid to pass from the third chamber to the second chamber when the pressure differential exceeds a selected minimum, and for preventing fluid flow in the opposite direction.

9. In a submersible pump assembly of the type having a motor section with a shaft extending upwardly through a seal section to a pump, an improved means for reducing pressure differential between lubricant fluid in the motor and seal sections and well fluid, comprising in combination:
- a first partition spaced below the top of the seal section, defining a first chamber above the first partition;
- a second partition spaced below the first partition in the seal section, defining a second chamber between the first and second partitions, and a third chamber below the second partition that contains the motor;

the shaft sealingly passing through both of the partitions;

a first bellows secured to the first partition, having one side in communication with lubricant fluid in the first chamber and another side in communication with lubricant fluid in the second chamber through a port extending through the first partition adjacent the shaft;

a secnd bellows secured to the second partition, having one side in communication with lubricant fluid in the second chamber and another side in communication with lubricant fluid in the third chamber, through a port extending through the second partition adjacent the shaft;

a third bellows located below the motor, having one side in communication with well fluid through a port in the motor section and another side in communication with lubricant fluid in the third chamber;

a first check valve means located in a passage in the first partition, for allowing fluid to pass from the second chamber to the first chamber when the pressure differential exceeds a selected minimum, and for preventing fluid flow in the opposite direction; and a second check valve means located in a passage in the second partition for allowing fluid to pass from the third chamber to the second chamber when the pressure differential exceeds a selected minimum, and for preventing fluid flow in the opposite direction.

10. In a submersible pump assembly of the type having a motor section with a shaft extending through a seal section to a pump, an improved means for reducing pressure differential between lubricant fluid in the motor and seal sections and well fluid, comprising in combination:

a plurality of partitions in the seal section, through which the shaft sealingly passes, dividing the seal section into a plurality of chambers; one of the chambers being a primary chamber in communication with an exterior port extending to the exterior;

a primary pressure compensator means, separating lubricant fluid from well fluid entering through the exterior port, for moving in response to pressure differential between lubricant in the primary chamber and well fluid;

a secondary pressure compensator means mounted to each partition at an interior port extending through each partition, separating lubricant fluid on the chamber on one side of each partition from lubricant fluid of the chamber on the other side, for moving in response to pressure differential between the chambers; and check valve means mounted within a passage passing through each partition, for allowing fluid to pass in a direction away from the primary chamber, but for preventing fluid flow in the opposite direction.

* * * * *